C. W. LEVALLEY.
SKID.
APPLICATION FILED FEB. 23, 1909.
984,379.
Patented Feb. 14, 1911.
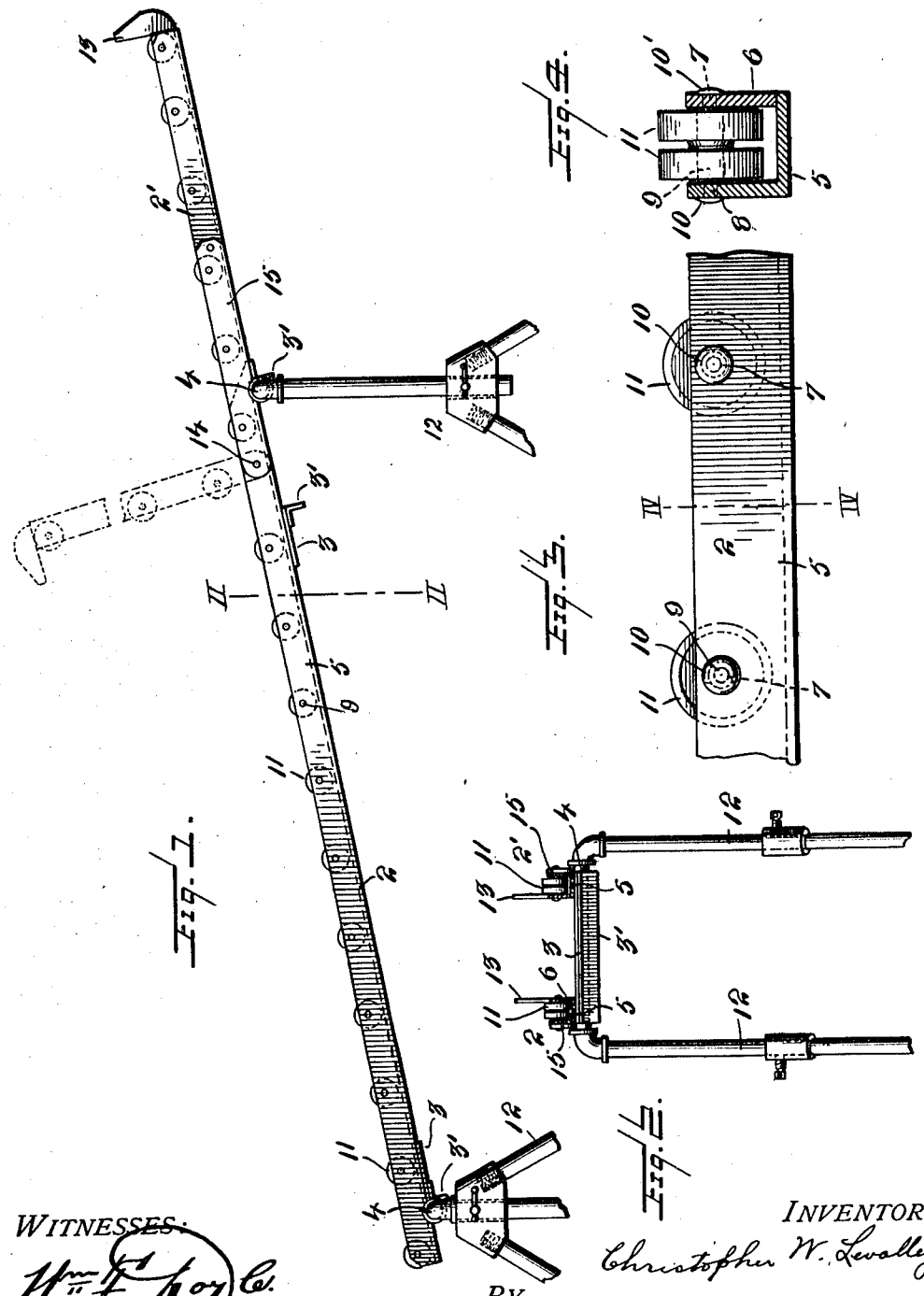
WITNESSES
Wm F Hoy
L. C. Brady
INVENTOR
Christopher W. Levalley
BY
J. V. Barker
his Attorney

UNITED STATES PATENT OFFICE.

CHRISTOPHER W. LEVALLEY, OF MILWAUKEE, WISCONSIN.

SKID.

984,379.

Specification of Letters Patent. Patented Feb. 14, 1911.

Application filed February 23, 1909. Serial No. 479,472.

*To all whom it may concern:*

Be it known that I, CHRISTOPHER W. LEVALLEY, a citizen of the United States, residing at Milwaukee, in the county of Milwaukee and State of Wisconsin, have invented new and useful Improvements in Skids, of which the following is a specification.

This invention relates to skids or gravity conveyers such as are employed in loading or transporting packages and heavy articles; and it has for its object to produce a skid or conveyer of novel construction possessing features of strength and advantage that will be hereinafter pointed out.

In the accompanying drawings, Figure 1 is a side elevation of a loading skid embodying my improvements. Fig. 2 is a cross sectional view of the same taken on the line II—II of Fig. 1. Fig. 3 is a side view of a short section of a longitudinal member of the skid on a larger scale than Figs. 1 and 2. Fig. 4 is a cross sectional view on the line IV—IV of Fig. 3.

I have in the drawings represented my invention as applied to a short roller conveyer constituting a loading skid and formed of two parallel roller-supporting bars that are preferably united and adapted to be supported upon trestles or in any other convenient way. It is evident, however, that the invention is adapted for use in conveyers or freight carriers which may be very considerably extended as to length and along which, usually by gravity, articles, such as boxes or cases of goods, are caused to travel. The longitudinal members of the conveyer are designated 2—2' and these are connected at suitable intervals by cross pieces which may be in the form of flat plates or bars 3, or angular bars 3'. Both forms are illustrated in Fig. 1 where the angular bars serve not only to unite the longitudinal members of the conveyer but also as stops which bear against the cross bars 4 of the trestles. The bars are of channel construction and each is formed of two parts—an L-angle bar 5 and a flat bar 6. The bar 5 constitutes the base and one side of the channel while the bar 6 forms the other side of the channel and is set opposite the upright member of the bar 5, its lower edge preferably resting directly upon the base member of such bar near its outer edge, as indicated in Fig. 4. The bars 5 and 6 are perforated, as indicated at 7, to receive the reduced ends 8 of the roller-carrying studs 9.

In manufacturing the supporting bars just described the ends of the studs are first inserted into the apertures formed in the side member of the angle-bar 5 and the extended ends thereof upset or riveted, as indicated at 10. The rollers 11 are then placed upon the studs and the flat bar 6 put in place after which the other ends of the studs are riveted, as at 10', thus securely holding the parts of the supporting bar together and confining the rollers in place. Each spindle or stud may support one or more rollers, as may be found desirable. The channel bar may be of any depth or breadth required, thus making it possible to easily give to the skid or conveyer the desired strength and adapt it to support rollers of the size and type most desirable for the particular use to which it may be put.

12, 12 indicate the trestles upon which the skid is supported. They are preferably adjustable as to height so that the inclination of the skid or conveyer may be varied as desired, as well as the height at which the conveyer as a whole is supported.

The conveyer may be provided at one or both ends with stops which are conveniently formed by turning up the end of the flat side member 6, as indicated at 13.

The skid illustrated in Fig. 1 is represented as being formed of two sections united by pivots 14 so that the shorter section 2' may be thrown back into the position indicated in dotted lines that it may be out of the way when not in use and leave an open passage between the skid or conveyer and the platform, truck, or other object, from or to which the skid or conveyer may be delivering. To provide for hinging or pivotally connecting the outer section of the skid the longitudinal bars thereof are provided at their inner ends with side plates 15 which are preferably riveted to the members 6 of the channel bars and extend beyond the ends thereof so as to overlap for a little the corresponding members of the main section 2 of the skid. The pivots 14 pass through the plates 15 and through one or both the side members of the channel bars. In order to hold the outer swinging section extended in line with the main section, the abutting ends of the two sections are beveled, as indicated in Fig. 1, so that when the parts are in line with each other and in working position the end of the main section extends under and serves as a rest for the pivoted section 2'. A further support for the latter can be afforded by the cross piece, 3 or 3', at the end of the main section.

From the foregoing description it will be seen that a skid or roller conveyer when built according to my invention can be easily constructed from stock material, and that its size and strength can be varied to an almost unlimited extent by proper selection of the material entering into its construction.

What I claim is:—

1. A roller conveyer having longitudinal channel bars for supporting the rollers each formed of an L-shaped member which constitutes the bottom and one side of the channel, and a flat bar constituting the other side of the channel, these members being united by the studs on which the rollers are supported.

2. A roller conveyer comprising longitudinal open channel bars each formed of an L-shaped member which constitutes the bottom and one side of a channel and a flat member which constitutes the other side of the channel, studs having reduced ends which pass through the said members and are upset at their ends thus serving to unite the members of the channels, and rollers loosely mounted on the studs.

3. A loading skid comprising a pair of parallel channel bars in which are mounted the rollers, and cross angle bars uniting the channel bars and arranged to form stops for resting against the supports upon which the skid may be placed to prevent longitudinal movement of the latter.

4. A roller conveyer comprising longitudinal channel bars in which the rollers are mounted, each bar having its side members separate from each other and united by the studs on which the rollers are supported, one of the said side members being of flat bar construction and extended beyond the end of the bar where it is bent at substantially right angles to constitute an end stop.

5. A loading skid comprising longitudinal bars and cross pieces uniting them, and formed of two sections pivotally united and adapted to be moved into line with each other or to be turned at an angle to each other, the longitudinal pieces of the sections of the skid being arranged to come together end to end when the sections are moved into line with each other, side pieces secured to the longitudinal bars of the outer swinging section, extending beyond the inner ends thereof and arranged to lie against the longitudinal bars of the stationary section, pivots uniting the said side pieces with the longitudinal bars of the stationary section, trestles upon which the skid rests, and means for holding the said main section of the skid against longitudinal movement on the trestles.

CHRISTOPHER W. LEVALLEY.

Witnesses:
M. O. FRYE,
WM. C. SARGENT.